United States Patent [19]

Grünsch

[11] Patent Number: 4,559,591
[45] Date of Patent: Dec. 17, 1985

[54] D.C. VOLTAGE CONVERTER INCLUDING A PULSE WIDTH CONTROLLED SEMICONDUCTOR SWITCH

[75] Inventor: Eckhardt Grünsch, Allmersbach im Tal, Fed. Rep. of Germany

[73] Assignee: ANT Nachrichtentechnik GmbH, Backnang, Fed. Rep. of Germany

[21] Appl. No.: 536,956

[22] Filed: Sep. 29, 1983

[30] Foreign Application Priority Data

Sep. 30, 1982 [EP] European Pat. Off. ........ 82109058.6

[51] Int. Cl.⁴ ........................................... H02M 3/335
[52] U.S. Cl. ....................................... 363/21; 363/56; 363/97
[58] Field of Search ..................... 363/20, 21, 55, 56, 363/97; 361/18

[56] References Cited

U.S. PATENT DOCUMENTS 4,268,898  5/1981  Brown .................................. 363/20
4,306,282  12/1981 Heinicke ............................. 363/27
4,455,596  6/1984  Baker .................................. 363/21

FOREIGN PATENT DOCUMENTS 0008539  5/1980  European Pat. Off. .
0026870  4/1981  European Pat. Off. .
1276895  6/1972  United Kingdom .

OTHER PUBLICATIONS

Joachim Wüstenhube, "Schaltnetzteile" [Switching Network Components] published by Expert Verlag 1979, p. 410.

Primary Examiner—Peter S. Wong
Assistant Examiner—Judson H. Jones
Attorney, Agent, or Firm—Spencer & Frank

[57] ABSTRACT

A d.c. voltage converter having alternating energy intake and energy discharge phases. The converter includes a power transformer having a core and at least primary, secondary and tertiary windings associated with the core. A primary circuit including a pulse width controlled semiconductor switch connected in series with the primary winding conducts an energy intake current during the energy intake phase of the converter. A secondary circuit including a smoothing capacitor and at least one rectifier element connecting the smoothing capacitor to the secondary winding conducts an energy discharge current during the energy discharge phase on the converter. Circuit means are provided for connecting the tertiary winding to the smoothing capacitor so that, following the energy discharge phase of the converter, excess energy of the smoothing capacitor in the form of an energy feedback current is fed back into the core until the start of the next energy intake phase of the converter.

4 Claims, 4 Drawing Figures

D.C. VOLTAGE CONVERTER INCLUDING A PULSE WIDTH CONTROLLED SEMICONDUCTOR SWITCH

BACKGROUND OF THE INVENTION

The present invention relates to a d.c. voltage converter including a pulse width controlled semiconductor switch in the main primary circuit and a power transformer having at least three windings, with the primary winding of the power transformer being connected in series with the semiconductor switch and the secondary winding being connected via at least one rectifier element with a smoothing capacitor in the main secondary circuit. Such a d.c. converter is disclosed, for example, in Joachim Wüstehube, *Schaltnetzteile* [Switching Network Components], published by Expert Verlag, 1979, page 410.

Switching transistors of clock pulse controlled d.c. voltage converters are operated by the load resistance with short or long turn-on pulses, depending on the load. It is customary to do this by comparing in a regulating circuit the integrated output voltage of the d.c. voltage converter with a reference voltage and deriving therefrom a regulating signal for controlling a pulse width modulator. Due to the integration of the output voltage required for trouble-free operation of the d.c. voltage converter, the d.c. voltage converter is able to react to changes in the load current only with a delay. This means that if the changes in the load current are rapid, the output voltage swings over or under to a greater or lesser degree, which is a particularly grave drawback in connection with d.c. voltage converters operating with small smoothing capacitances.

In order to save space and weight, d.c. voltage converters are now being developed which operate with higher switching frequencies permitting the use of small smoothing capacitances, e.g. foil capacitors, which have the advantage over aluminum electrolyte capacitors that they have a longer service life. Conventional d.c. voltage convertors are able to operate only marginally with small smoothing capacitances and only if no changes or only small changes can occur in the load current.

If, however, the jump in the load current is large, e.g. from maximum load to the complete absence of a load (idling), the stored energy of an inductance, for example the secondary inductance of the power transformer or the inductance of a smoothing choke, cannot be prevented from flowing into the smoothing capacitor, even if the switching transistors were switched off immediately. In this case the smoothing capacitor may take on a voltage which is a multiple of the normal output voltage.

SUMMARY OF THE INVENTION

It is therefore an object of the present invention to design a d.c. voltage converter so that sudden, large changes in load result in only slight changes in the voltage output of the converter even at high switching frequencies.

The above and other objects are accomplished by the present invention which provides for a d.c. voltage converter having alternating energy intake (storage) and energy discharge phases and includes a power transformer having a core and at least primary, secondary and tertiary windings associated with the core. The converter includes a primary circuit having a pulse width controlled semiconductor switch connected in series with the primary winding for conducting an energy intake current during the energy intake phase of the converter, and a secondary circuit, including a smoothing capacitor and at least one rectifier element connecting the smoothing capacitor to the secondary winding for conducting an energy discharge current during the energy discharge phase of the converter. Additionally, the converter includes a circuit means for connecting the tertiary winding to the smoothing capacitor so that, following the energy discharge phase of the converter, excess energy of the smoothing capacitor in the form of an energy feedback current is fed back into the core until the start of the next energy intake phase of the converter.

In the present invention, the behavior of the converter upon the occurrence of sudden changes in load is improved significantly when compared to conventional d.c. voltage converters. Even if there is a change in load from full load to no load, the output voltage will not overshoot because the excess energy in the smoothing capacitor is able to flow back to the core of the power transformer and remains stored there until the converter goes into its next energy intake phase. By returning the energy in the smoothing capacitor back to the core, the energy discharge period of the secondary current is extended. Upon a change in load from full load to no load, the energy discharge period changes only very slightly. The result is again only a slight change in output voltage. Therefore the loop gain is improved with respect to conventional d.c. voltage converters. The lower loop gain makes the converter more stable with respect to regulating oscillations and thus reduces hunting.

The energy feedback according to the present invention produces a further advantage in connection with coupled, unregulated secondary output circuits. Due to the fact that the change in time of the energy discharge period is relatively slight when there is a change in load between full load and no load, and the time of the no-load state is relatively long, the linkage of the secondary winding of the regulated secondary output circuit with the secondary windings of the unregulated coupled secondary output circuits remains effective for a longer period of time. Compared to conventional coupled secondary output circuits, the coupling characteristics are improved.

DESCRIPTION OF THE PREFERRED EMBODIMENTS

Figure 1:
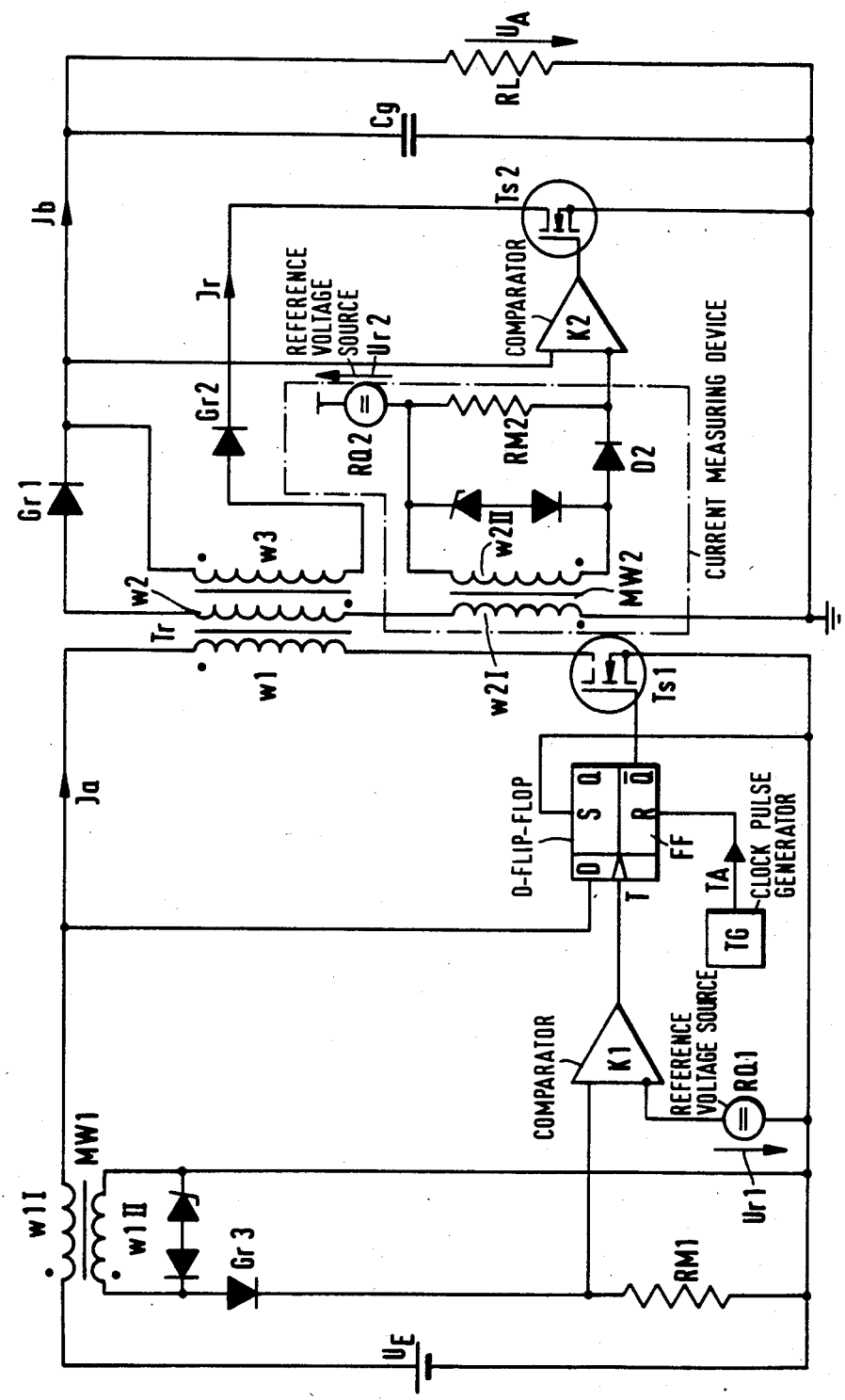
FIG. 1 is a circuit schematic showing a d.c. voltage converter according to the invention.

FIG. 1 shows a circuit arrangement of a d.c. voltage converter operating according to the blocking converter principle. Its storage inductance for energy storage and energy discharge during different switching phases is provided by a transformer Tr which galvanically, or conductively, separates the primary circuit from the secondary circuit. A d.c. voltage source $U_E$ is connected in series with a primary winding W1I of a first current measuring transformer MW1, the primary winding w1 of the energy storing transformer Tr and a pulse width controlled semiconductor switching transistor Ts1, which is preferably an MOS field effect power transistor. The secondary winding w2 of transformer Tr is connected, via a rectifier element Gr1, with a smoothing a capacitor Cg and a load resistance RL.

In the steady state operation of the circuit illustrated in FIG. 1, a clock pulse generator TG emits a short clock pulse Ta, at time TO (see FIG. 2), to a reset input R of a positive edge controlled D-flip-flop FF having Q and $\overline{Q}$ outputs. Output Q of D-flip-flop FF then carries no output voltage. Output $\overline{Q}$, however, has a positive output voltage and turns on a switching transistor Ts1 via a control electrode. An energy intake, or storage, current Ja then flows from voltage source $U_E$ through primary winding w1I of current measuring transformer MW1 and primary winding w1 of transformer Tr. The initial level Jo of energy intake current Ja is determined by the d.c. premagnetization at time TO. The d.c. premagnetization depends on the input voltage and the load. The energy intake current Ja rises, with the slope of the rise depending on the inductance of transformer Tr and input voltage $U_E$. The level of energy intake current Ja during its rise is monitored by means of current measuring transformer MW1. For this purpose, the secondary winding W1II of current measuring transformer MW1 is connected, via a rectifier Gr3, with a current measuring resistor RM1. Resistor RM1 exhibits a voltage drop proportional to the level of energy intake current Ja. Comparator K1 compares the voltage drop at resistor RM1 with a reference voltage Ur1 of a reference voltage source RQ1. If the voltage drop at resistor RM1 is below reference voltage Ur1, switching transistor Ts1 remains switched on, since in this case the output of comparator K1 carries no output voltage. At time T1 energy intake current Ja reaches a predetermined maximum value Js (see FIG. 2). When value Js is reached, the level of which depends on the energy to be supplied by the converter, energy intake is to be terminated. The voltage drop at resistor RM1 at time T1 exceeds reference voltage Ur1, and the output of comparator K1 will have a positive potential which is transmitted to the clock pulse input T of D-flip-flop FF. Output $\overline{Q}$ of D-flip-flop FF is thus caused to jump from a positive potential to zero potential, which turns off switching transistor Ts1. Energy intake current Ja is thereby prevented from flowing which eliminates the voltage drop at resistor RM1. This in turn causes the output of comparator K1 to jump back from positive potential to zero potential. Flip-flop FF, however, continues to keep switching transistor Ts1 in the turned off state until the beginning of the new clock pulse period at time T2 when a clock pulse Ta of clock pulse generator Tg resets flip-flop FF. Energy storage then begins anew.

As explained above at time T1, i.e. at the end of energy intake phase, switching transistor Ts1 is blocked. There then flows only an energy discharge current Jb from secondary winding w2 of transformer Tr through rectifier element Gr1, smoothing capacitor Cg and load resistance RL, respectively, and through a primary winding w2I of a second current measuring transformer MW2 back to secondary winding w2 of transformer Tr. The flowing energy discharge current Jb is transferred by means of current measuring transformer MW2 to the secondary winding w2II and, after rectification in rectifier element D2, generates a voltage drop at a measuring resistor RM2, which voltage drop is proportional to the output voltage $U_A$ across load resistance RL. At the inverting input of a comparator K2, a reference voltage Ur2 of a reference voltage source RQ2 is connected in series with the voltage drop across measuring resistor RM2. The noninverting input of comparator K2 is at the potential of output voltage $U_A$. The sum of the voltage drop across RM2 and reference voltage Ur2 exceeds output voltage $U_A$. Therefore, zero potential appears at the output of the comparator K2 and a further electronic switch Ts2, which preferably is an MOS field effect power transistor like switching transistor Ts1, is blocked.

The energy discharge current Jb flows to load resistor RL and, because of the inductance of transformer Tr, would continue to flow, as in a conventional d.c. voltage converter, with a descending characteristic, until a new clock pulse of clock pulse generator TG at a time T3 would terminate the energy discharge. In the d.c. voltage converter according to the present invention, however, the energy discharge current Jb is terminated earlier, namely at time T2. Time T2 depends on the output voltage $U_A$ and indicates the point at which the voltage derived from the energy discharge current Jb falls below the output voltage $U_A$. In this case, the sum of reference voltage Ur2 and the voltage drop across measuring resistor RM2 falls precisely below the value of output voltage $U_A$. Since, however, the slow decline of energy discharge current Jb, (see negative slope of current characteristic Jb starting at T1 in FIG. 2) is independent of load, time T2 is determined solely by the level of output voltage $U_A$. If there is no load at the output, $U_A$ increases, i.e. time T2 is reached earlier. At the output of comparator K2 there thus occurs at time T2 a jump from zero potential to positive potential and electronic switch Ts2 is controlled to be conductive. Energy discharge current Jb is terminated and only an energy feedback current Jr flows from smoothing capacitor Cg over tertiary winding w3 of transformer Tr, rectifier element Gr2, the switching path of switching transistor Ts2 back to smoothing capacitor Cg. Energy feedback current Jr returns the excess energy of smoothing capacitor Cg back into the core of transformer Tr during the time between an energy discharge phase at the secondary, for example at time T2, and the next energy intake phase, for example at time T3.

When there is a jump from full load to no load, the change in time of the energy discharge period during time interval T1—T2 is slight. Therefore there also is only a slight change in output voltage $U_A$. Due to this fact, it is possible to select a high resistance value for measuring resistor RM2. The loop gain is then less, and the d.c. voltage converter is more stable against hunting.

At time T3, feedback current Jr ends as a new energy intake phase of the d.c. voltage converter is initiated again. This is done by the emission of a clock pulse Ta (see FIG. 2) from clock pulse generator TG to reset input R of flip-flop FF.

Figure 2:
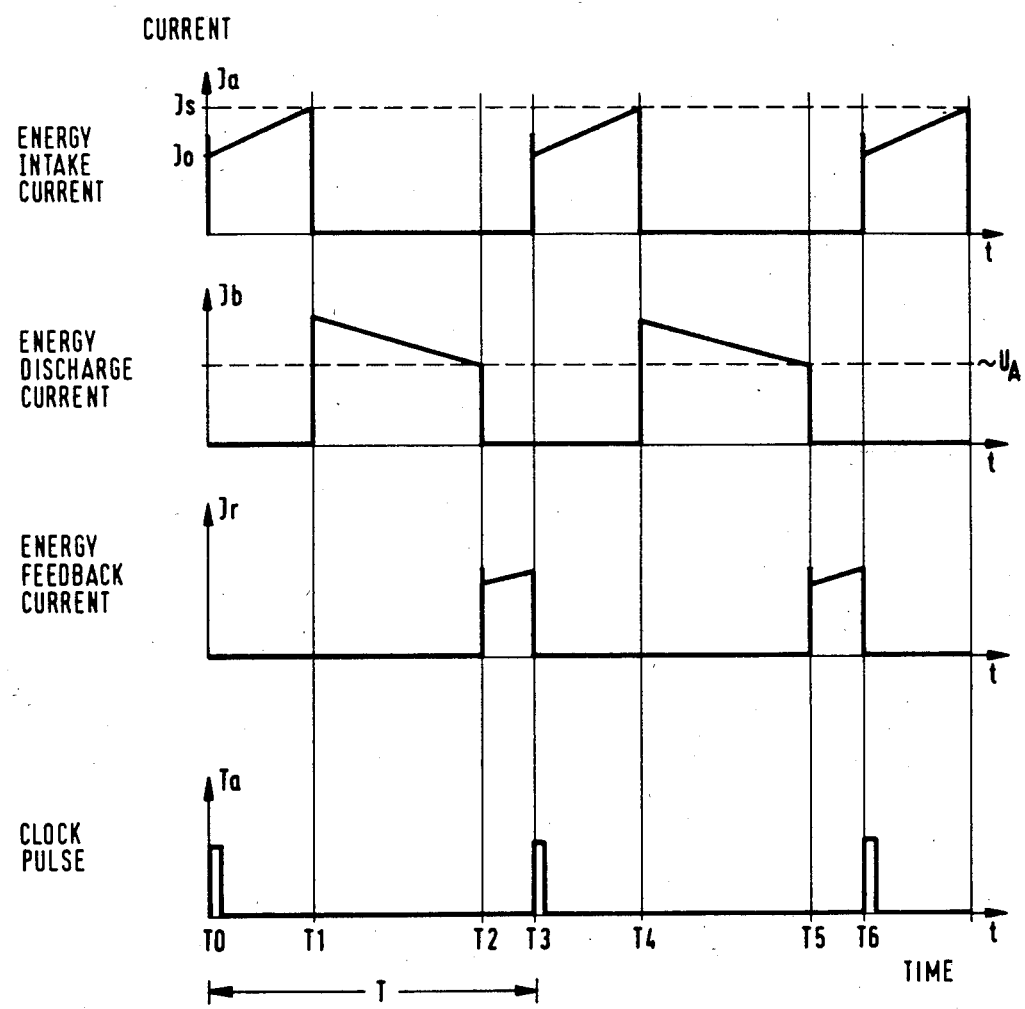
FIG. 2 is a diagram showing various currents as a function of time in connection with the converter of FIG. 1.

The pulse peaks at the rising edges of currents Ja and Jr shown in FIG. 2 originate from the clean-out currents of the rectifiers.

Figure 3:
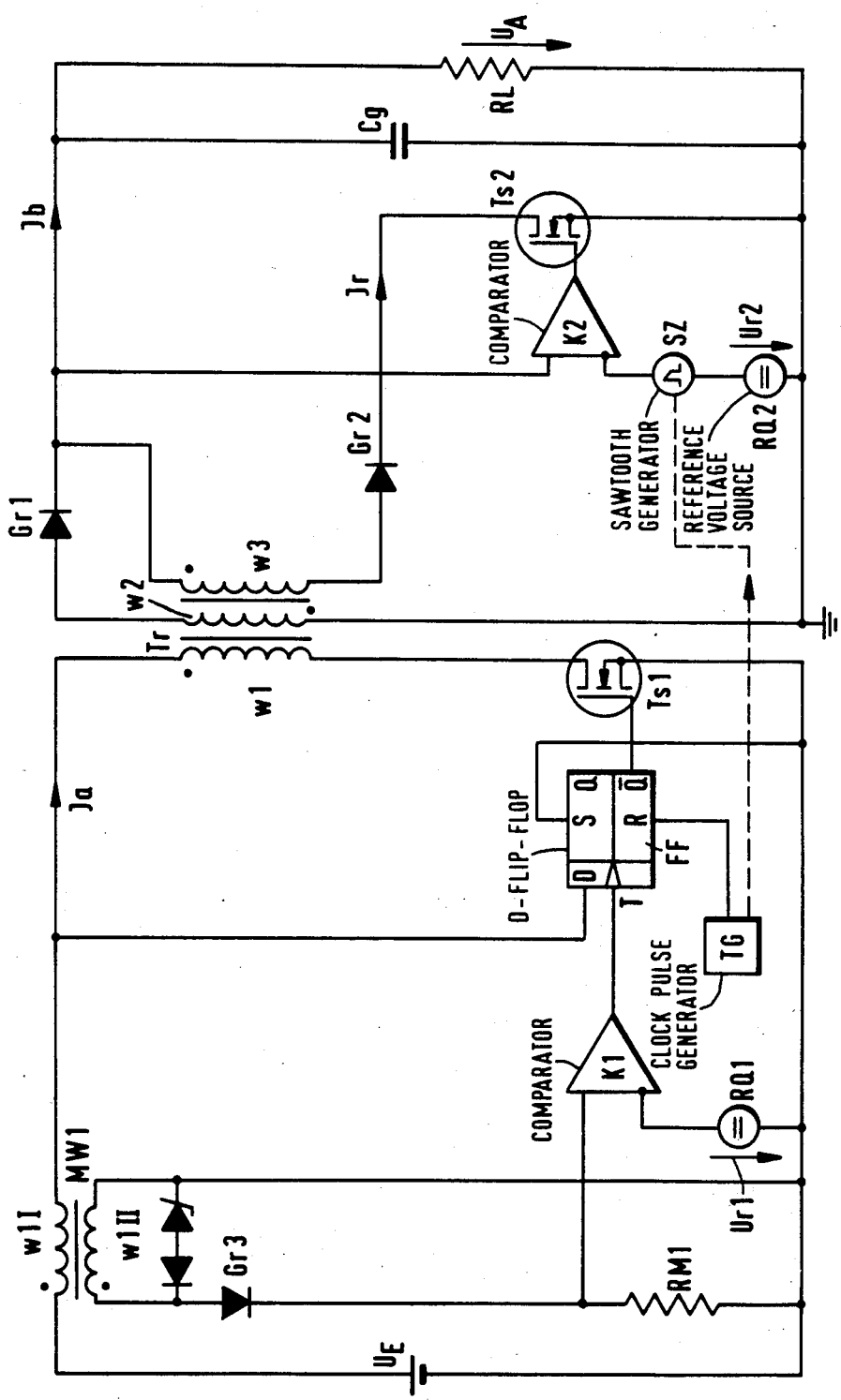
FIG. 3 is a circuit schematic showing another embodiment of a d.c. voltage converter according to the invention.

FIG. 3 shows another embodiment of the d.c. voltage converter according to the present invention. Instead of current measuring transformer MW2 with measuring resistor RM2, this embodiment of the d.c. voltage converter according to the invention has a sawtooth generator SZ which is synchronized by clock pulse generator TG. The energy intake occurs in a manner corresponding to that in the d.c. voltage converter shown in FIG. 1. Sawtooth generator SZ is started by a clock pulse Ta from clock pulse generator TG (dashed line in FIG. 3). The sawtooth voltage of sawtooth generator SZ decreases gradually from a high initial value. Beginning at time T1, the energy discharge current Jb flows as in the embodiment of FIG. 1. If the sum of the reference voltage Ur2 and the superposed, slowly decreasing sawtooth signal falls below the output voltage $U_A$, the output of comparator K2 changes potential from zero potential to positive potential. Electronic switch Ts2 becomes conductive and a feedback current Jr flows which is the energy intake current for the core of transformer Tr. The current curves shown in FIG. 2 are also applicable to the embodiment of FIG. 3. As in the embodiment of FIG. 1, time T2 of the onset of feedback current Jr depends on the level of the output voltage $U_A$. Depending on whether there is a load or no load at the output, this time occurs later or earlier, respectively.

Figure 4:
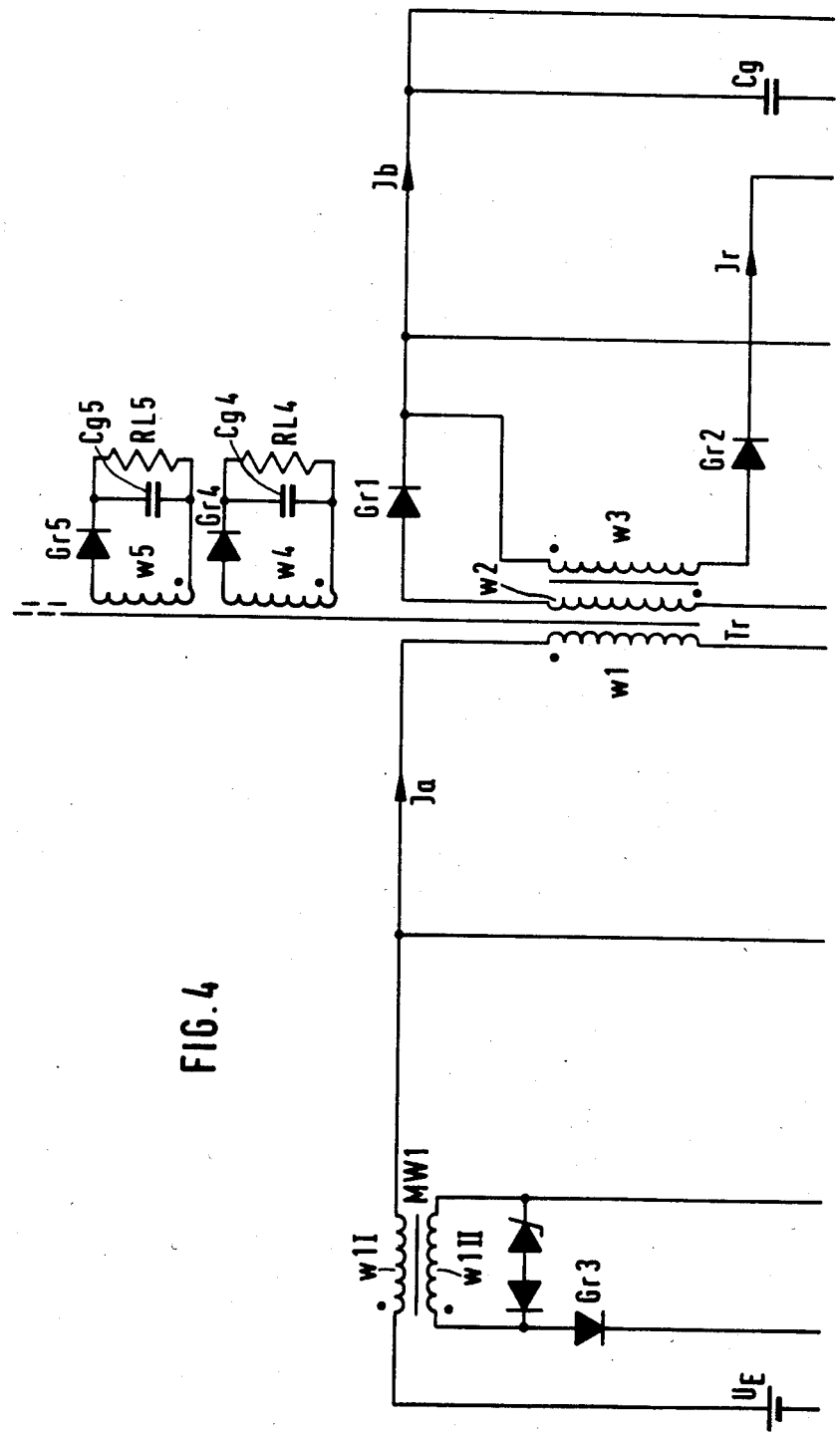
FIG. 4 shows a partial circuit schematic of a further embodiment of a d.c. converter according to the invention.

The converter according to FIG. 4 is designed similarly to the converter to FIG. 1, with the difference that its transformer Tr has further windings w4, w5, which together with rectifier elements Gr4 and Gr5, respectively, and the corresponding smoothing capacitors Cg4 and Cg5 and load resistances RL4 and RL5, form coupled, unregulated secondary output circuits.

By feeding back, according to the invention, the excess energy of smoothing capacitor Cg of the regulated output, the coupled, unregulated secondary output circuits benefit from improved coupling characteristics. If there is a jump in load from full load to no load, the change in time for the energy discharge current Jb is very slight. Since the latter is coupled with the output voltage $U_A$ via measuring resistor RM2, the change in output voltage $U_A$ is also only slight. The time between T1 and T2, i.e. the duration of the energy discharge phase during which energy discharge current Jb flows is relatively long even with no load. Windings w4 and w5 of the coupled, unregulated output circuits are therefore coupled with the regulated secondary circuit for a longer period of time which results in better coupling characteristics for the unregulated output circuits.

It will be understood that the above description of the present invention is susceptible to various modifications, changes and adaptations, and the same are intended to be comprehended within the meaning and range of equivalents of the appended claims.

What is claimed is:

1. A d.c. voltage blocking converter having energy storage phases alternating with energy discharge phases, said converter comprising:

a power transformer having a core and at least primary, secondary and tertiary windings associated with said core;

a primary circuit including said primary winding and a pulse width controlled semiconductor switch connected in series with said primary winding for conducting an energy storage current during the energy storage phase of said converter;

a secondary circuit including said secondary winding, a smoothing capacitor and at least one rectifier element connecting said smoothing capacitor to said secondary winding for conducting an energy discharge current during the energy discharge phase of said converter; and circuit means comprising a second semiconductor switch controlled by a reference signal for connecting said tertiary winding to said smoothing capacitor so that, following the energy discharge phase of said converter, excess energy of said smoothing capacitor in the form of an energy feedback current is fed back into said core until the start of the next energy storage phase of said converter.

2. A d.c. voltage converter having energy storage phases alternating with energy discharge phases, said converter comprising:

a power transformer having a core and at least primary, secondary and tertiary windings associated with said core;

a primary circuit including said primary winding and a pulse width controlled semiconductor switch connected in series with said primary winding for conducting an energy storage current during the energy storage phase of said converter;

a secondary circuit including said secondary winding, a smoothing capacitor and at least one rectifier element connecting said smoothing capacitor to said secondary winding for conducting an energy discharge current during the energy discharge phase of said converter, said tertiary winding having a first winding end and a second winding end, said one rectifier element and said smoothing capacitor having a common connection point connected to the first winding end of said tertiary winding, and said smoothing capacitor having a remote electrode facing away from said one rectifier element;

a voltage output terminal, said converter producing an output voltage at said output voltage terminal; and circuit means for connecting said tertiary winding to said smoothing capacitor so that, following the energy discharge phase of said converter, excess energy of said smoothing capacitor in the form of an energy feedback current is fed back into said core until the start of the next energy storage phase of said converter, said circuit means including:

a second rectifier element connected to the second winding end of said tertiary winding and oriented in the current flow direction of the feedback current which flows from said smoothing capacitor through said tertiary winding via said common connection point and back to the remote electrode of said smoothing capacitor via said second rectifier element;

a further semiconductor switch having a control electrode and forming a current switching path between said second rectifier element and the remote electrode of said smoothing capacitor;

a clock pulse synchronized sawtooth generator having an output and producing a clock pulse synchronized sawtooth signal at such output; and a comparison device having a first input connected to the output of said sawtooth generator, a second input connected to said output voltage terminal, and an output connected to the control electrode of said further semiconductor switch, said comparison device being constructed for emitting a turn-on signal at its output for turning-on said further semiconductor switch when a monentary value of the signal at the output of said sawtooth generator falls below a monentary value of the output voltage of said converter.

3. A d.c. voltage converter having energy storage phases alternating with energy discharge phases, said converter comprising:
- a power transformer having a core and at least primary, secondary and tertiary windings associated with said core;
- a primary circuit including said primary winding and a pulse width controlled semiconductor switch connected in series with said primary winding for conducting an energy storage curent during the energy storage phase of said converter;
- a secondary circuit including said secondary winding, a smoothing capacitor and at least one rectifier element connecting said smoothing capacitor to said secondary winding for conducting an energy discharge current at the conclusion of the energy storage phase and during the energy discharge phase of said converter, said tertiary winding having a first winding end and a second winding end, said one rectifier element and said smoothing capacitor having a common connection point connected to the first winding end of said tertiary winding, and said smoothing capacitor having a remote electrode facing away from said one rectifier element;
- an output voltage terminal, said converter producing an output voltage at said output voltage terminal;
- circuit means for connecting said tertiary winding to said smoothing capacitor so that, following the energy discharge phase of said converter, excess energy of said smoothing capacitor in the form of an energy feedback current is fed back into said core until the start of the next energy storage phase of said converter, said circuit means including:
- a second rectifier element connected to the second winding end of said tertiary winding and oriented in the current flow direction of feedback current flowing from said smoothing capacitor through said tertiary winding via said common connection point and back to the remote electrode of said smoothing capacitor via said second rectifier element;
- a further semiconductor switch having a control electrode and forming a current switching path between said second rectifier element and the remote electrode of said smoothing capacitor;
- a current measuring means having an output and connected for deriving a voltage from the energy discharge current; and
- a comparison device having a first input connected to the output of said current measuring means, a second input connected to said output voltage terminal, and an output connected to the control electrode of said further semiconductor switch, said comparison device being constructed for emitting a turn-on signal for turning on said further semiconductor switch when the voltage derived from the energy discharge current by said current measuring means falls below a momentary value of the output voltage of said converter.

4. A converter as defined in claim 1, in combination with coupled, nonregulated secondary output circuits, wherein said power transformer includes additional windings each of which is associated with a respective one of said coupled, nonregulated secondary circuits.

* * * * *